United States Patent
Schnaider et al.

(10) Patent No.: US 9,763,437 B2
(45) Date of Patent: Sep. 19, 2017

(54) CONTROL SYSTEM AND METHOD FOR A SUSPENDED BOOM SPRAYER

(71) Applicant: NORAC Systems International Inc., Saskatoon (GB)

(72) Inventors: James Schnaider, Martensville (CA); Nolan Garrecht, Dalmeny (CA)

(73) Assignee: NORAC Systems International Inc., Saskatoon, SK (CA)

( * ) Notice: Subject to any disclaimer, the term of this patent is extended or adjusted under 35 U.S.C. 154(b) by 0 days.

(21) Appl. No.: 15/152,891

(22) Filed: May 12, 2016

(65) Prior Publication Data
US 2016/0330948 A1     Nov. 17, 2016

(30) Foreign Application Priority Data
May 14, 2015   (GB) .................................. 1508250.6

(51) Int. Cl.
*A01M 7/00*     (2006.01)
*A01C 23/00*    (2006.01)

(52) U.S. Cl.
CPC ......... *A01M 7/0057* (2013.01); *A01C 23/008* (2013.01); *A01M 7/0075* (2013.01); *A01M 7/0085* (2013.01)

(58) Field of Classification Search
CPC ... A01M 7/0057; A01M 7/0053; A01C 15/04; A01G 25/09; A01B 69/008; F16M 11/041
See application file for complete search history.

(56) References Cited

U.S. PATENT DOCUMENTS

| | | | |
|---|---|---|---|
| 2,988,287 A * | 6/1961 | Sherman | A01G 25/09 239/726 |
| 4,709,857 A | 12/1987 | Wilger | |
| 4,763,836 A | 8/1988 | Lyle et al. | |
| 4,877,189 A | 10/1989 | Williams | |

(Continued)

FOREIGN PATENT DOCUMENTS

| | | |
|---|---|---|
| EP | 2559332 A1 | 2/2013 |
| JP | 2008129813 A | 6/2008 |

(Continued)

OTHER PUBLICATIONS

Extended European Search Report mailed Sep. 28, 2016 in connection with European Patent Application No. EP 16169677.8-1656, 9 pages.

(Continued)

*Primary Examiner* — Yuri Kan
(74) *Attorney, Agent, or Firm* — Chiesa Shahinian & Giantomasi PC (57) ABSTRACT

A control system for a suspended boom sprayer of a vehicle comprises: first and second sensors each configured to be disposed on respective first and second boom wings of the suspended boom sprayer and to provide an output responsive to a rotation of the first and second wings caused by a disturbance torque; a processor, configured to determine a differential acceleration between the first and second wings based on the outputs of the respective sensors, and to determine the disturbance torque corresponding to the differential acceleration; and at least one actuator, controllable to move one or both of the first and second wings in order to counter the disturbance torque.

18 Claims, 6 Drawing Sheets

(56) References Cited

U.S. PATENT DOCUMENTS

| | | | |
|---|---|---|---|
| 5,018,668 A * | 5/1991 | Bauer | A01C 15/04 198/675 |
| 5,348,226 A | 9/1994 | Heiniger et al. | |
| 5,630,547 A * | 5/1997 | Klemenhagen | A01M 7/0057 239/161 |
| 5,794,582 A | 8/1998 | Horiuchi | |
| 5,931,882 A | 8/1999 | Fick et al. | |
| 5,988,528 A | 11/1999 | Krohn et al. | |
| 6,010,079 A | 1/2000 | Mayfield et al. | |
| 6,021,959 A | 2/2000 | Mayfield et al. | |
| 6,053,419 A | 4/2000 | Krohn et al. | |
| 6,230,091 B1 | 5/2001 | McQuinn | |
| 6,834,223 B2 | 12/2004 | Strelioff et al. | |
| 7,150,419 B1 | 12/2006 | Tomlonovic et al. | |
| 7,953,550 B1 | 5/2011 | Weiting | |
| 8,185,303 B1 | 5/2012 | Weiting | |
| 9,049,854 B2 * | 6/2015 | Ellsworth | A01M 7/0053 |
| 2004/0093912 A1 | 5/2004 | Krieger et al. | |
| 2004/0158381 A1 * | 8/2004 | Strelioff | A01M 7/0057 701/50 |
| 2005/0055142 A1 | 3/2005 | McMurtry et al. | |
| 2005/0196163 A1 * | 9/2005 | Mootz | F16M 11/041 396/428 |
| 2010/0185364 A1 * | 7/2010 | McClure | A01B 69/008 701/41 |
| 2011/0282554 A1 | 11/2011 | Keye | |
| 2014/0048368 A1 | 2/2014 | Maagaard | |
| 2014/0074360 A1 | 3/2014 | Rosa et al. | |
| 2014/0277676 A1 | 9/2014 | Gattis et al. | |

FOREIGN PATENT DOCUMENTS

| | | |
|---|---|---|
| WO | 2004081499 A2 | 9/2004 |
| WO | 2015040133 A1 | 3/2015 |

OTHER PUBLICATIONS

International Search Report and Written Opinion mailed Apr. 3, 2008, in connection with International Patent Application No. PCT/AU2008/000175, 7 pgs.

International Preliminary Report on Patentability (Chapter II) mailed Jan. 30, 2009, in connection with International Patent Application No. PCT/AU2008/000175, 3 pgs.

* cited by examiner

FIG. 1

PRIOR ART

FIG. 2

PRIOR ART

CONTROL SYSTEM AND METHOD FOR A SUSPENDED BOOM SPRAYER

REFERENCE TO PRIOR APPLICATION

This application claims the benefit of United Kingdom Patent Application No. 1508250.6, filed May 14, 2015, the disclosure of which is herein incorporated by reference in its entirety.

TECHNICAL FIELD

The present invention relates to a control system for a suspended boom sprayer of a vehicle, and a method of controlling a suspended boom sprayer of a vehicle.

BACKGROUND

Figure 1:
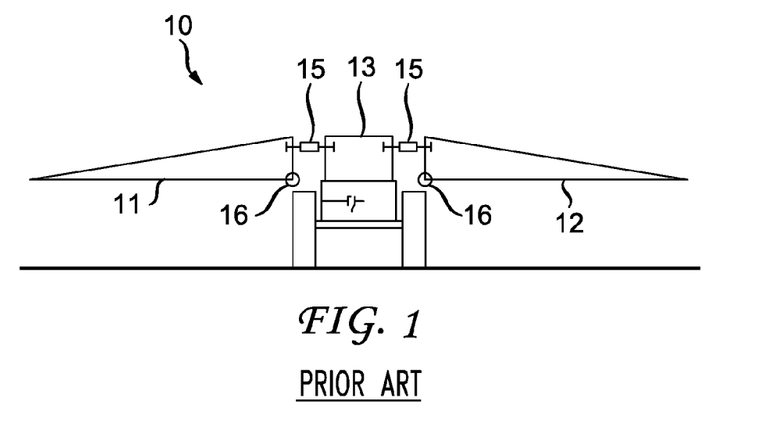
FIG. 1 is a schematic representation of the components of a conventional sprayer vehicle comprising a sprayer boom.

Suspended boom sprayers are commonly used in agriculture in order to apply materials such as pesticides, herbicides and fertilizers over a wide swathe of land. By way of an example, FIG. 1 shows a schematic representation of the components commonly found in a conventional sprayer boom 10, including the two boom wings 11, 12, a centre frame 13 to which the boom wings 11, 12 are connected and a vehicle frame 14 to which the centre frame 13 is attached. Common sprayer boom designs use a boom centre frame 13 with wings 11, 12 suspended from each side. The wings of variable geometry booms can be adjusted upward or downward using one or more hydraulic actuators 15, each wing 11, 12 pivoting from a hinge point 16 connection with the centre frame 13. These booms may also be folded inwardly for transport with hydraulic actuators, pivoting each wing 11, 12 about a vertical axis.

In order to efficiently cover a large swathe of ground, it is advantageous to use boom sprayers with long wings. The boom wings from which the materials are sprayed can often extend to more than 22 meters from the chassis of a vehicle upon which the boom is mounted. As a result of this large distance, a small rotation of the chassis can cause a significant movement of the ends of the boom wings. Consequently the spray tips deviate from their intended location, which can cause the spray to be applied unevenly across the field. There is also a possibility of the boom wings crashing into the ground or another obstacle. Furthermore, the acceleration required to move the ends of the boom wings produces large stresses along the length of the wings, which can damage or break them.

It is therefore necessary for vehicles with long sprayer booms to include a means of mitigating the effects of chassis rotation on the position of the boom wings. This is typically achieved using a suspension system, a positioning system, or a combination of the two.

Rotational movement of the boom is usually described in terms of roll, yaw and pitch, which correspond to rotation around three different axes. For the purposes of the present invention, pitch motion is less important than roll and yaw so this will not be a point of emphasis herein.

Rolling movement corresponds to a rotation around an axis parallel to the direction that the vehicle travels in. In some designs this can occur when the wheels on only one side of the vehicle travel over a bump in the ground or when spraying a sloped field. The extent to which this effect is seen will be dependent upon many factors such as the relative positions of the centre of gravity and the boom pivot point, as well as the sprayer chassis suspension, tyres, chassis flex, and so on. Rolling rotation causes up-down movement of the boom wings and therefore creates a significant risk of damage to the boom from striking the ground as well as resulting in uneven spray application.

Yawing movement corresponds to rotation around a vertical axis and occurs when the vehicle turns. This causes a forward-back motion of the boom wings, which is unlikely to result in the wings striking the ground but still produces large stresses and causes uneven chemical application.

The effect of boom yaw may also transfer into a boom roll component, and the effect of boom roll may also transfer into a boom yaw component.

From now onwards rolling and yawing motion will be treated herein as interchangeable, unless they are specifically described as otherwise, with the described displacements being applicable to rotations around either of the relevant axes.

An important aspect of sprayer design is a suspension that uncouples the spray boom from the chassis to provide a uniform spray distribution. These systems reduce the effect of input disturbances on the boom such as field bumps causing chassis roll, or steering/tracking input producing chassis yaw, which affect boom stability and consequently application performance.

When a spray vehicle is driving over uneven terrain, any disturbances will usually be imparted to the vehicle through its wheels, and must then be transmitted through a number of elements before reaching the boom wings. There are, therefore, a number of different locations at which the individual boom wings may be uncoupled from an outside disturbance input.

Figure 2:
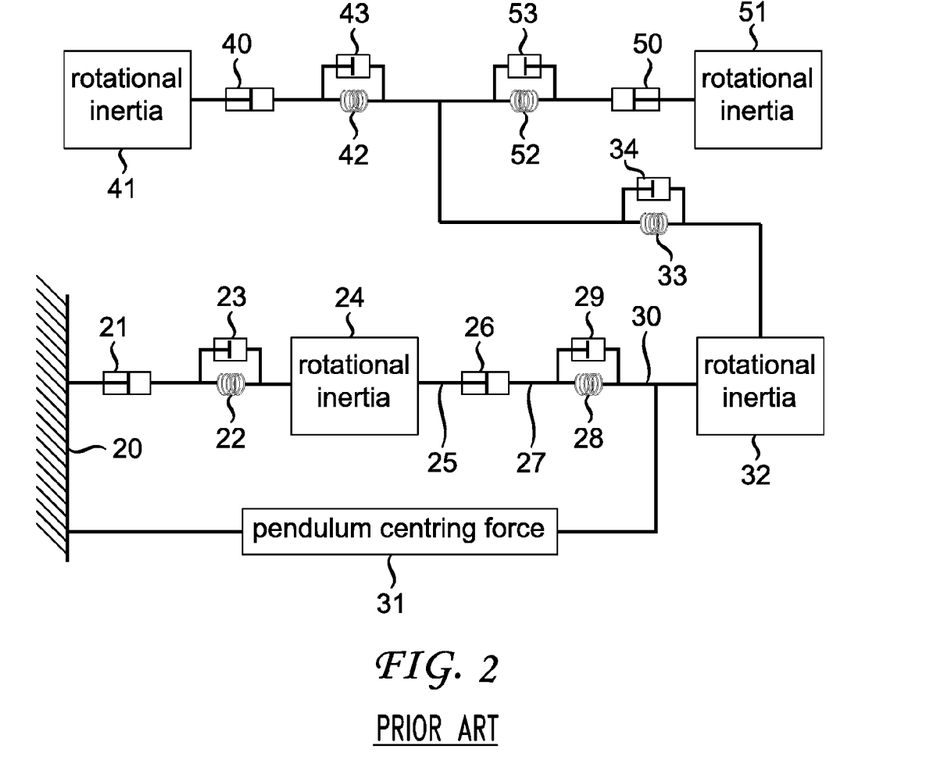
FIG. 2 is a schematic representation of a suspension system of the vehicle and sprayer boom of FIG. 1.

FIG. 2 shows a schematic diagram of a general suspension system in which each of the main elements of a boom sprayer vehicle is uncoupled to some extent from its surrounding components by use of parallel spring and damping components. In FIG. 2:

Level inclination/reference distance 20 is the distance from a specified reference point, which could, for certain systems, be the horizontal plane normal to gravity;

The disturbance input 21 is the effect between the ground and vehicle tyres, such as a bump beneath a wheel;

22 and 23 are the spring and damping system component of the tyres and axle suspension;

24 is the rotational inertia of the sprayer chassis;

25 is a support frame of the boom suspension;

26 is a hydraulic actuator between the support frame 25 and an intermediate frame 27 which will exist in some common designs;

28 and 29 are the spring and damper components of a pivoting boom suspension system. The spring and damper locations can be reversed without affecting the operation of the system, and the suspension (spring damper) and roll actuator can be reversed as well;

30 is the boom frame;

31 is the pendulum centring force applied to the boom frame. This is likely not applicable for yaw suspension systems because boom yaw is not typically affected by gravity;

32 is the rotational inertia of the boom frame, which is typically small in comparison to the left and right wings;

33 and 34 are the spring and damper for a linked boom roll suspension (if applicable);

40 and 50 are the hydraulic actuators that connect between the boom center frame 30 and the left and right wing boom section. These are normally used to adjust the position of the wings with respect to the centre frame to follow changing terrain;

41 and 51 represent the rotational inertia of the left and right boom wings respectively;

42 and 52 are the spring components of the left and right wing independent suspension; and 43 and 53 are the damping components of the left and right wing independent suspension.

Suspension elements 28, 29 and 33, 34 are not likely to occur in the same system because they are basically redundant. 28/29 is found in a pivoting suspension, whereas 33/34 is found in a linked suspension.

Most common suspension designs usually include some but not all of these components. The pendulum-centring force 31, for instance, is due to gravity and may be found in roll suspension systems but is unlikely to be applicable to a yaw suspension system. In a roll suspension system, such a term would depend on the centre of gravity of the boom wings and the location of their pivot points. Not all roll suspension systems will have this term.

Some conventional boom height control systems use boom suspension position as an input for a controller. The method of measurement may be called the "displacement method" wherein suspension displacement is measured using a relative position (or angular) measurement between two points of the suspension. The suspension displacement may be measured and used to optimize the automated corrections made to wing position. In some instances suspension deflection is measured at multiple points because more than one source of suspension may exist. This measurement may also require compensation to correct for static offsets in suspension position due to gravitational effects on sidehills or radial acceleration from driving around corners.

Boom suspension displacement measurements may be used to determine the torque existing between the sprayer chassis and boom in order to minimize the torque using a torque biasing element, such as a mechanical system in series with the boom suspension. Force is measured as a function of suspension or spring displacement.

These conventional methods may face the following challenges:

(1) Displacement is measured at the primary point of suspension deflection; however some amount of suspension deflection will almost always occur in other points of the sprayer. This may include the sprayer tyres, axle suspension, frame flex, and lift arm flex, for example. The extent of this problem will vary from one machine design to the next. Some designs may also feature multiple points of designed boom rotation requiring multiple measurements;

(2) Some sprayer designs do not feature boom roll suspension and consequently suspension is occurring in other places, such as twist on the chassis. These sprayer designs may be referred to as rigid booms. In this situation it is difficult to measure suspension activity as a function of deflection using conventional methods;

(3) Different sprayer designs require a variety of sensor and mounting options in order to measure suspension accurately increasing system complexity; and (4) The boom suspension typically includes a damping element which will dampen suspension deflection and therefore attenuate force measurements, reducing measurement sensitivity.

Therefore, a need exists for an improved technique for a control system for a suspended boom sprayer of a vehicle.

BRIEF SUMMARY OF THE EMBODIMENTS

According to various embodiments, there is provided a control system for a suspended boom sprayer of a vehicle, comprising: first and second sensors, each configured to be disposed on respective first and second boom wings of the suspended boom sprayer and to provide an output responsive to a rotation of the first and second wings caused by a disturbance torque; a processor, configured to determine a differential acceleration between the first and second wings based on the outputs of the respective sensors, and to determine the disturbance torque corresponding to the differential acceleration; and at least one actuator, controllable to move one or both of the first and second wings in order to counter the disturbance torque.

A disturbance of the suspended boom wings tends to occur when, for example, the vehicle passes over a bump (causing the wings to roll) or changes direction (causing the wings to yaw). The invention is predicated on the realisation that, when the wings are so disturbed, the only source of torque on the wings is via the mechanical connection to the sprayer vehicle. Furthermore, the magnitude of the disturbance torque is related directly to the acceleration of the wings as they rotate in response to the disturbance. Thus, quantification of the acceleration, and thereby the torque, allows the determination of a counter-torque which can be applied to the wings to restore them to the desired position. This technique of controlling the wing position, which may be referred to as an "inertia method", is highly advantageous because it takes account of the effect of all suspension elements influencing the acceleration of (or torque applied to) the wings (suspended boom mass). In contrast, the conventional "displacement method" can determine the position of the primary boom suspension but may be in error due to activity of other suspension elements. Accordingly, the inventive control system provides more accurate control of the boom wings.

Conventional systems may correlate torque, occurring between the boom and the chassis, to the angular/rotational position between the chassis and boom. Such systems require a reference measurement from a reference sensor, for example positioned on the chassis or perhaps on the boom. The signal must be compared against the reference because the system relies on the principle of relative angular position, deriving torque from position. Whereas, in the present invention a differential acceleration signal is obtained and using that signal the torque applied to the suspended boom is determined. No reference signal or sensor is required because the signal is inertial; the frame of reference is the boom's position in space. Thus a further advantage is that fewer sensors are required.

The first and second sensors may be configured to output respective first and second tangential accelerations of the first and second wings; and the processor may be configured to subtract the first tangential acceleration from the second tangential acceleration in order to determine the differential acceleration between the first and second wings. Each of the first and second sensors may comprise an accelerometer.

The first and second sensors may be configured to output respective first and second angular velocities of the first and second wings; and the processor may be configured to determine the differential acceleration between the first and second wings by either: subtracting the first angular velocity from the second angular velocity, and differentiating the resultant angular velocity; or differentiating each of the first and second angular velocities to obtain respective first and second angular accelerations, and subtracting the first angular acceleration from the second angular acceleration. Each of the first and second sensors may comprise a gyroscope.

The processor may be configured to control the at least one actuator to move one or both of the first and second wings in order to counter the disturbance torque. Alternatively, the control system may include a controller for controlling the at least one actuator to move one or both of the first and second wings in order to counter the disturbance torque.

The control system may comprise a first actuator, controllable to move one of the first and second wings, and a second actuator, controllable to move the other of the first and second wings, in order to counter the disturbance torque.

The boom rotation may be about a roll axis or a yaw axis of the vehicle.

According to an embodiment, a suspended boom sprayer comprises a control system as described herein above. According to another aspect of the invention, a vehicle comprises the said suspended boom sprayer.

According to a another embodiment, there is provided a method of controlling a suspended boom sprayer of a vehicle, comprising: receiving first and second sensor outputs which are responsive to a rotation of respective first and second boom wings of the suspended boom sprayer caused by a disturbance torque; determining a differential acceleration between the first and second wings based on the outputs of the respective sensors; determining the disturbance torque corresponding to the differential acceleration; and moving one or both of the first and second wings in order to counter the disturbance torque.

The first and second sensor outputs may comprise respective first and second tangential accelerations of the first and second wings; and determining the differential acceleration between the first and second wings may comprise subtracting the first tangential acceleration from the second tangential acceleration.

Alternatively, the first and second sensor outputs may comprise respective first and second angular velocities of the first and second wings; and determining the differential acceleration between the first and second wings may comprise either: subtracting the first angular velocity from the second angular velocity, and differentiating the resultant angular velocity; or differentiating each of the first and second angular velocities to obtain respective first and second angular accelerations, and subtracting the first angular acceleration from the second angular acceleration.

A computer program may comprise instructions adapted to carry out a method as described herein above. According to another aspect of the invention, there is provided a computer readable medium, having a computer program recorded thereon, wherein the computer program is adapted to make the computer execute the said method.

BRIEF DESCRIPTION OF THE DRAWINGS

Embodiments will now be described, by way of example, with reference to the accompanying figures in which.

DETAILED DESCRIPTION

Figure 3:
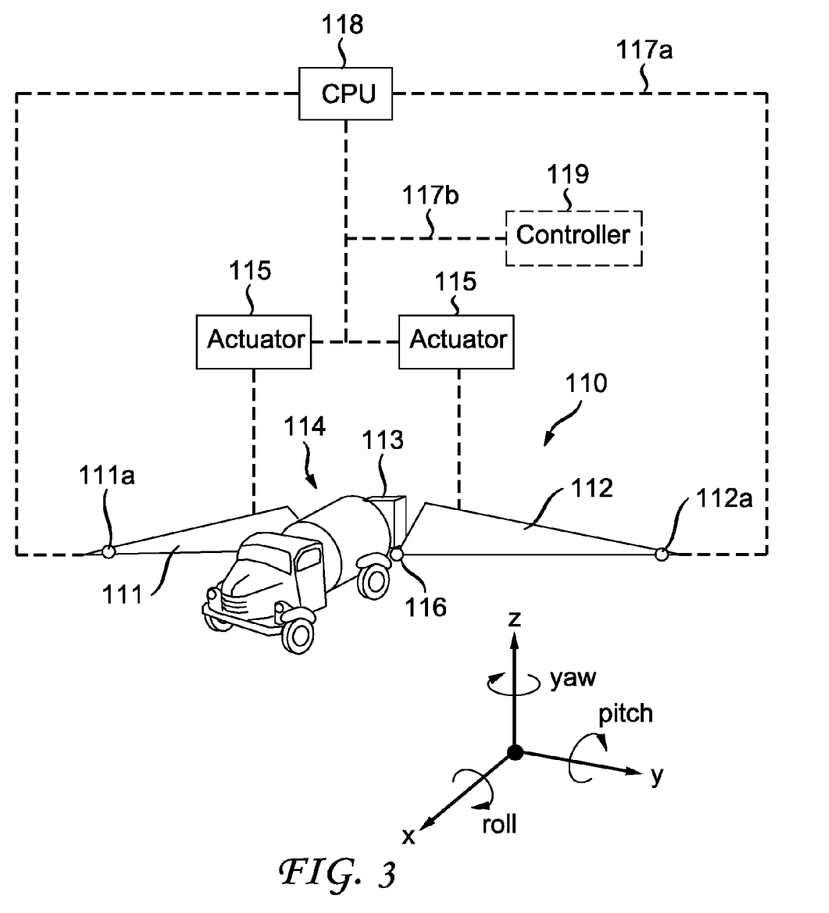
FIG. 3 illustrates a sprayer vehicle including a suspended sprayer boom and a control system thereof, in accordance with an embodiment of the invention.

Referring to FIG. 3, a boom sprayer vehicle is equipped with a suspended sprayer boom 110 comprising first and second boom wings 111, 112, a centre frame 113 to which the wings 111, 112 are connected at respective hinge points 116 (only one of which is shown), and a vehicle frame 114 to which the centre frame 113 is attached.

A system for controlling the suspended sprayer boom 110 includes first and second sensors 111a, 112a which are located on the respective first and second wings 111, 112 and arranged to communicate, for example via a cable or a wireless connection 117a, with a central processing unit or CPU 118 of the control system. Optionally, each of the sensors 111a, 112a may be conveniently integrated into an otherwise conventional component or sensor (not shown) which is typically installed on the respective wing 111, 112 for some measurement or detection purpose, for example an ultrasonic height sensor, a radar sensor, a lidar sensor, or the like.

In this exemplary embodiment, each of the sensors 111a, 112a comprises an accelerometer which is configured to detect and quantify an acceleration of its respective wing 111, 112. The accelerometers may be located at any position along the lengths of the wings 111, 112, that is at an outboard location, an inboard location, or anywhere there between. Preferably the accelerometers are placed at or near the outermost parts of the wings 111, 112 in order to provide the greatest possible tangential acceleration signal, as will discussed in more detail later herein.

Figure 4A:
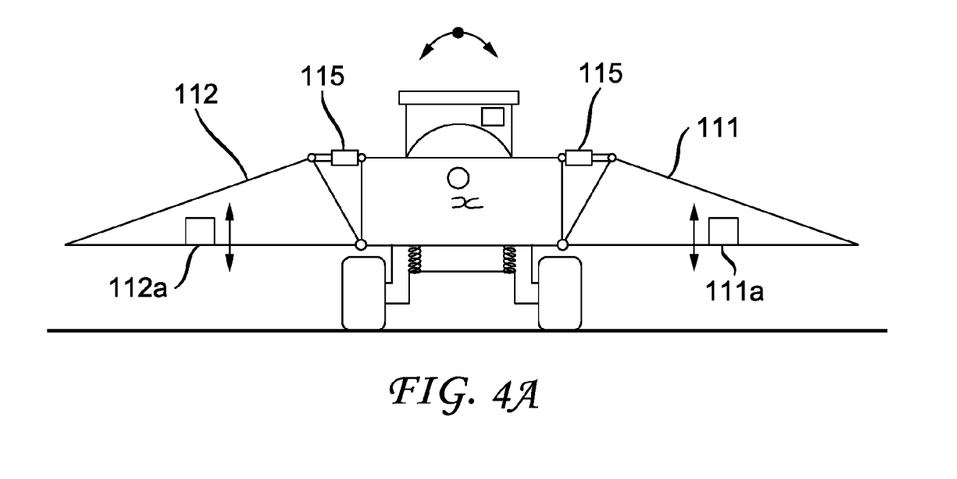
FIGS. 4a and 4b, respectively, illustrate rolling and yawing motions of the suspended boom of FIG. 3.
Figure 4B:
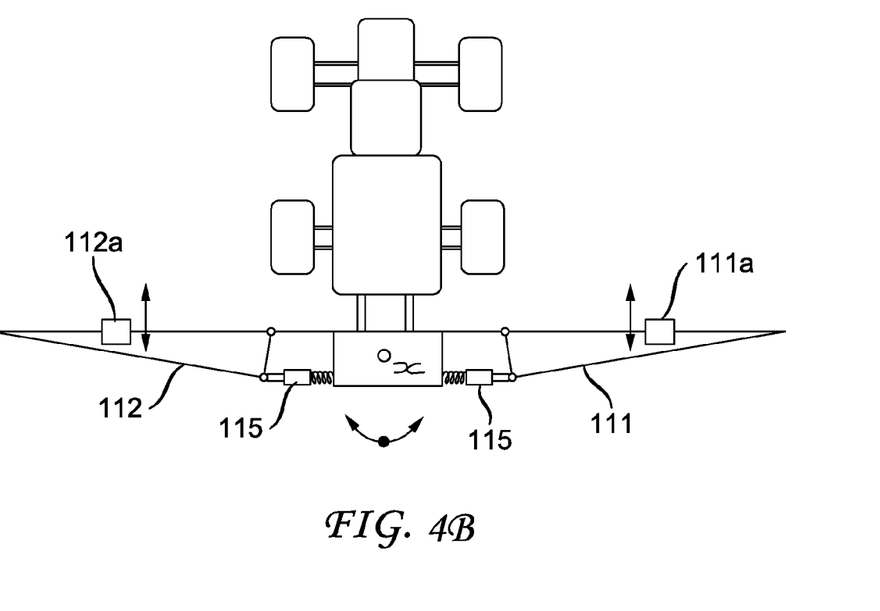

Also in this embodiment, the control system further comprises a controller 119 which is configured to communicate with the CPU 118, via a cable or a wireless connection 117b, and, with reference now also to FIGS. 4a and 4b, first and second actuators 115 which are arranged to move the respective first and second wings 111, 112 about a roll axis x (FIG. 4a) or a yaw axis z (FIG. 4b) of the vehicle according to commands provided by the controller 119. Alternatively, the separate controller 119 may be omitted and the actuators 115 may instead be configured to receive control commands from the CPU 118 itself.

Figure 5:
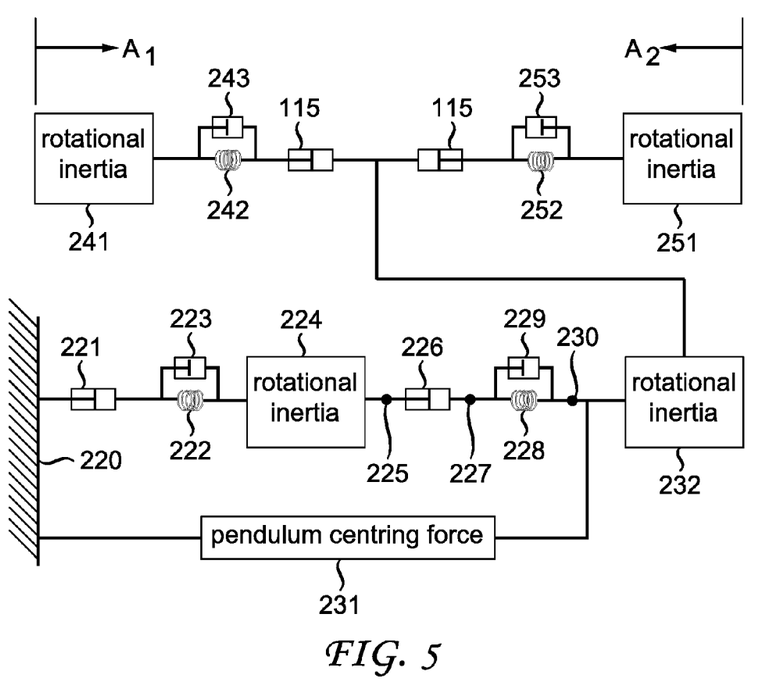
FIG. 5 is a schematic representation of a suspension system of the vehicle and suspended sprayer boom of FIG. 3, including a first embodiment of the control system.

Referring now to FIG. 5, each of the main elements of the boom sprayer vehicle is uncoupled to some extent from its surrounding components by use of parallel spring and damping components. In FIG. 5:

Level inclination/reference distance 220 is the distance from a specified reference point, for example the horizontal plane normal to gravity;

The disturbance input 221 is the effect between the ground and vehicle tyres, such as a bump beneath a wheel;

222 and 223 are the spring and damping system component of the tyres and axle suspension;

224 is the rotational inertia of the sprayer chassis;

225 is the support frame of the boom suspension;

226 is an hydraulic actuator between support frame 225 and an intermediate frame 227 of the vehicle; in other words a suspension position biasing element;

228 and 229 are the spring and damper components of the primary boom suspension system. The spring and damper locations can be reversed without affecting the operation of the system, and the suspension (spring damper) and roll actuator can be reversed as well;

230 is the boom frame;

231 is the pendulum centring force applied to the boom frame;

232 is the rotational inertia of the boom frame, which is typically small in comparison to the left and right wings;

115 are the left and right wing position actuators;

241 and 251 represent the rotational inertia of the left and right boom wings respectively;

242 and 252 are the spring components of the left and right suspended wings;

243 and 253 are the damping components of the left and right suspended wings; and A1 and A2 are accelerations of the first and second wings 111, 112 respectively.

The operation of the control system will now be described. When the suspension system receives a vertical disturbance 221, for example due to the vehicle passing over uneven ground, a disturbance torque is applied which will tend to rotate the boom wings 111, 112 up/down about the roll axis x. Accordingly, each of the wings 111, 112 is subjected to a "vertical" acceleration as it rolls under the applied torque. Similarly, a lateral disturbance 221, for example due to the vehicle changing direction, will cause a disturbance torque which rotates the boom wings 111, 112 fore/aft about the yaw axis z. Thus, each of the wings 111, 112 is subjected to a "lateral" acceleration as it yaws under the applied torque. Since the boom is suspended, the only source of torque on the wings 111, 112 is via the mechanical connection to the sprayer vehicle. Furthermore, the magnitude of the disturbance torque is related directly to the tangential acceleration of the wings 111, 112 as they rotate in response to the disturbance.

Figure 6:
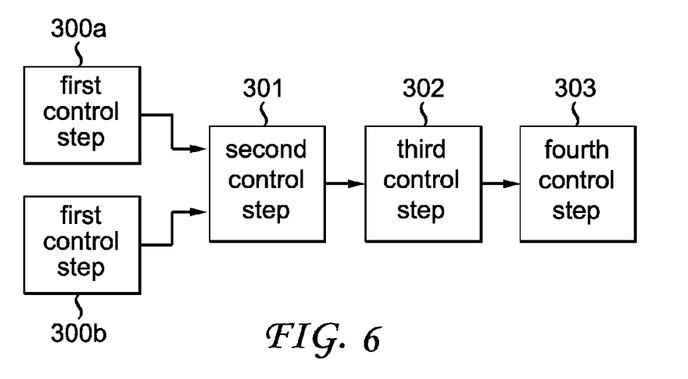
FIG. 6 illustrates a control method of the first embodiment of the control system.

Referring now also to FIG. 6, in a first control step 300a, 300b, each of the sensors (in this case accelerometers) 111a, 112a disposed on the wings 111, 112 measures the tangential acceleration A1, A2 of its respective wing 111, 112 as the wing 111, 112 is rotated (in roll or yaw). Signals containing the measured first and second accelerations A1, A2 are then passed to the CPU 118 via the communication link 117a.

In a second control step 301, in the CPU 118 the first acceleration A1 is subtracted from the second acceleration A2 in order to determine a differential acceleration of the two wings 111, 112. Obtaining the differential acceleration is beneficial because it accounts for any measurement errors due to translational movement of the wings 111, 112.

In a third control step 302, in the CPU 118 the magnitude of the torque, which has caused the rotation of the wings 111, 112, is determined according to the differential acceleration. For example, a value of torque may be determined by the CPU 118 by multiplying the differential acceleration signal by a known scaling factor. The CPU 118 may further modify the signal with known processes, such as removing the deadband, or filtering the signal to reduce noise. A torque value signal is then passed from the CPU 118 to the controller 119 via the communication link 117b.

In a fourth control step 303, a command signal is sent from the controller 119 to at least one of the actuators 115, via the communication link 117b, in order that the actuator(s) 115 will apply a counter-torque to the wing(s) 111, 112 to restore the wing(s) 111, 112 to a desired position.

Thus, according to the "inertia method", when the wings 111, 112 are disturbed (rotated in roll or yaw) the resulting acceleration of the wings 111, 112 is quantified and used to determine the disturbance torque. From this, a countering torque is determined and applied to the wings 111, 112 in order to restore the wings 111, 112 to the correct position.

One wing 111, 112 may be raised as the other is lowered, but not necessarily at the same rate or the same time. That is, the two wings 111, 112 may be rotated at differing rates and/or times if this is required to restore their positions. Although in most situations it may not be so effective, it is also possible to control the actuator(s) to move (raise or lower) only one of the first and second wings 111, 112 while keeping the other wing 111, 112 stationary.

In the embodiments described herein above, the first and second wings 111, 112 are not connected by a physical link. Nevertheless, it should be understood that the control system of the invention may complement conventional boom arrangements which do comprise a physical link between wings. In this respect the control system may be said to be "retrofittable" to conventional boom systems. The control actuator(s) for rotating the wings 111, 112 may comprise a part of another, existing system of the vehicle.

It should be further understood that, while the embodiments described herein above comprise two actuators 115 for rotating the wings 111, 112, in other embodiments the control system may comprise a different number of actuators for this purpose. For example, a single actuator may be arranged to move each of the first and second wings, simultaneously or in isolation. Or, more than two actuators could be arranged to move the wing(s) 111, 112.

Figure 7:
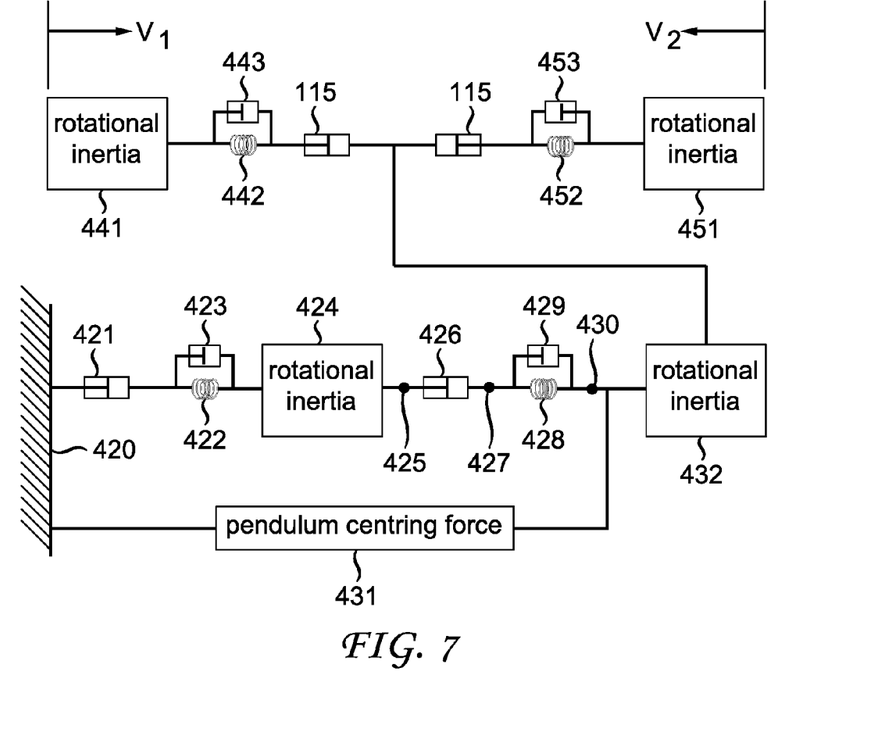
FIG. 7 is a schematic representation of a suspension system of the vehicle and suspended sprayer boom of FIG. 3, including a second embodiment of the control system.

Turning now to FIG. 7, a further embodiment of the control system is shown where each of the sensors 111a, 112a comprises a gyroscope which is configured to quantify an angular velocity V1, V2 of its respective wing 111, 112. The gyroscopes may be located at any position along the lengths of the wings 111, 112, that is at an outboard location, an inboard location, or anywhere there between. In other respects FIG. 7 is similar to FIG. 5, so that in FIG. 7:

Level inclination/reference distance 420 is the distance from a specified reference point, for example the horizontal plane normal to gravity;

The disturbance input 421 is the effect between the ground and vehicle tyres, such as a bump beneath a wheel;

422 and 423 are the spring and damping system component of the tyres and axle suspension;

424 is the rotational inertia of the sprayer chassis;

425 is the support frame of the boom suspension;

426 is an hydraulic actuator between support frame 425 and an intermediate frame 427 of the vehicle; in other words a suspension position biasing element;

428 and 429 are the spring and damper components of the primary boom suspension system. The spring and damper locations can be reversed without affecting the operation of the system, and the suspension (spring damper) and roll actuator can be reversed as well;

430 is the boom frame;

431 is the pendulum centring force applied to the boom frame;

432 is the rotational inertia of the boom frame, which is typically small in comparison to the left and right wings;

115 are the left and right wing position actuators;

441 and 451 represent the rotational inertia of the left and right boom wings respectively;

442 and 452 are the spring components of the left and right suspended wings;

443 and 453 are the damping components of the left and right suspended wings; and V1 and V2 are angular velocities of the first and second wings 111, 112 respectively.

Figure 8:
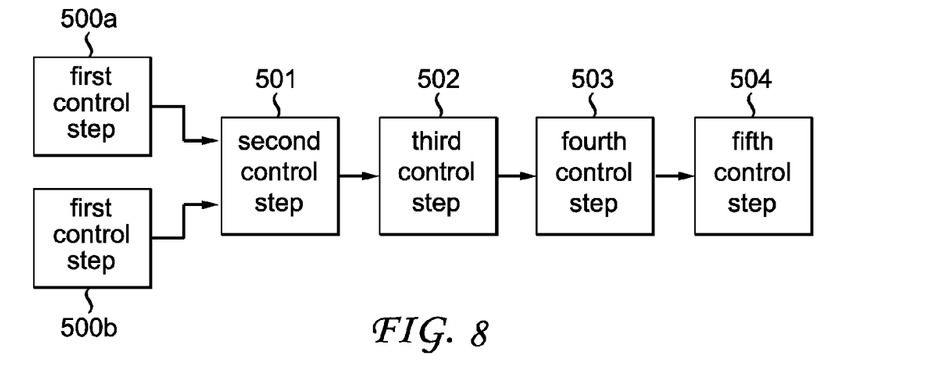
FIG. 8 illustrates a control method of the second embodiment of the control system.

Referring now also to FIG. 8, in a first control step 500a, 500b, each of the sensors (in this case gyroscopes) 111a, 112a disposed on the wings 111, 112 measures the angular velocity V1, V2 of its respective wing 111, 112 as the wing 111, 112 is rotated (in roll or yaw). Signals containing the measured first and second angular velocities V1, V2 are then passed to the CPU 118 via the communication link 117a.

In a second control step 501, in the CPU 118 the first angular velocity V1 is subtracted from the second angular velocity V2 in order to determine a differential angular velocity of the two wings 111, 112.

In a third control step 502, in the CPU 118 the differential angular velocity is differentiated in order to obtain the differential acceleration of the two wings 111, 112. Again, the differential acceleration accounts for any measurement errors due to translational movement of the wings 111, 112.

Alternatively, the operations of the second and third control steps 501, 502 may be reversed. That is, the second control step 501 may comprise differentiating each of the first and second angular velocities V1, V2 in order to obtain the first and second accelerations A1, A2 of the two wings 111, 112, and the third control step 502 may comprise subtracting the first acceleration A1 from the second acceleration A2 in order to determine the differential acceleration of the wings 111, 112.

In a fourth control step 503, in the CPU 118 the magnitude of the torque, which has caused the rotation of the wings 111, 112, is determined according to the differential acceleration, as has already been described herein above. That is, a value of torque may be determined by the CPU 118 by multiplying the differential acceleration signal by a known scaling factor. The CPU 118 may further modify the signal with known processes, such as removing the deadband, or filtering the signal to reduce noise. A torque value signal is then passed from the CPU 118 to the controller 119 via the communication link 117b.

In a fifth control step 504, a command signal is sent from the controller 119 to at least one of the actuators 115, via the communication link 117b, in order that the actuator(s) 115 will apply a counter-torque to the wing(s) 111, 112 to restore the wing(s) 111, 112 to a desired position.

Thus, when the sensors 111a, 112a comprise gyroscopes instead of accelerometers, it is necessary to take the derivative of the angular velocity measured by each of the gyroscopes in order to determine the acceleration of each of the wings 111, 112.

It should be understood that other types of sensors will be suitable for use in the control system, provided that the sensors produce an output from which the acceleration of the wings 111, 112 may be measured or derived.

Figure 9:
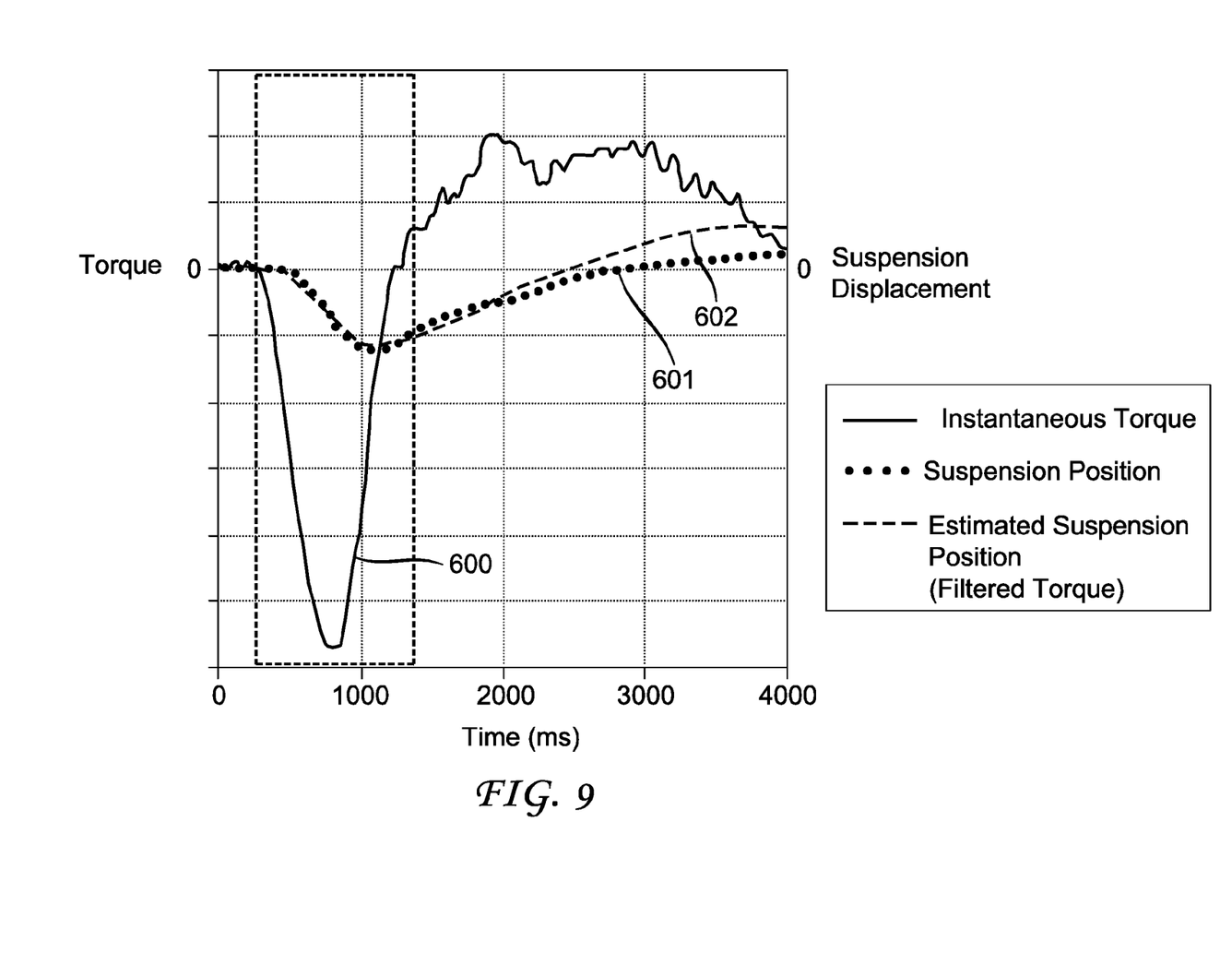
FIG. 9 is a graph illustrating a performance benefit of the inventive control system.

Referring now to FIG. 9, there is shown an improved measurement response of the torque applied to a suspended boom during a roll input disturbance. Within the window of time indicated by the rectangular box, a rapid change in the sprayer chassis inclination was applied. This effect would be seen, for example, when driving over a bump causing the chassis to roll rapidly. The "inertia measurement signal" 600 responds rapidly to the input, although the change in the "displacement measurement signal" 601 is attenuated due to the effect of suspension mechanical damping. Also shown in FIG. 9 is an "estimated suspension position signal" 602 which is generated by applying a low pass filter to the inertia measurement signal 600. The estimated position matches closely the measured suspension position signal 602, although diverging slightly as the boom suspension returns to its neutral state. Because the chassis has been inclined, the suspension position signal 602 experiences an offset due to the pendulum effect of the boom. The magnitude of this effect varies by boom design. This measurement offset is problematic and is normally corrected by the controller with a variety of approaches to compensate for the measurement error. The suspension position estimation generated from inertia measurement does not include this position error because it is inertia-based and not position-based.

Thus it will be seen that the "inertia method", which is enabled by the inventive control system, takes account of the effect of all suspension elements influencing the acceleration of (or torque applied to) the boom wings 111, 112 (suspended boom mass). In contrast, the conventional "displacement method" can determine the position of the primary boom suspension but may be in error due to activity of other suspension elements. The displacement method measurement is also attenuated by the effect of the spring and damper components 28, 29 of the pivoting boom suspension system (see FIG. 2), reducing sensitivity and consequently performance.

The "inertia measurement signal" 600 is useful in either the roll or yaw direction where the automated controller uses the signal to mitigate torque applied to the boom assembly by control of the suspension biasing element by adjustment of the biasing element. The signal obtained from the sensor pair is not attenuated by the effect of the spring and damper components, allowing higher sensitivity and automatic control performance. This technique, of determining the acceleration and thereby determining the torque, can also be used to estimate suspension position by applying a filter, such as a low-pass filter (digital and/or analogue), to the torque obtained by the pair of sensors. The filter is analogous to the damping effect of the force applied through the mechanical suspension. The filter may be tuned to suit the dynamic response of suspension components supporting the suspended boom. Determining the suspension in this way provides a more accurate signal than in conventional methods of measuring suspension activity between two points (for example the boom and the chassis) because it encompasses all sources of suspended boom suspension activity.

It should be noted that for clarity of explanation, the illustrative embodiments described herein may be presented as comprising individual functional blocks or combinations of functional blocks. The functions these blocks represent may be provided through the use of either dedicated or shared hardware, including, but not limited to, hardware capable of executing software. Illustrative embodiments may comprise digital signal processor ("DSP") hardware and/or software performing the operation described herein. Thus, for example, it will be appreciated by those skilled in the art that the block diagrams herein represent conceptual views of illustrative functions, operations and/or circuitry of the principles described in the various embodiments herein. Similarly, it will be appreciated that any flowcharts, flow diagrams, state transition diagrams, pseudo code, program code and the like represent various processes which may be substantially represented in computer readable medium and so executed by a computer, machine or processor, whether or not such computer, machine or processor is explicitly shown. One skilled in the art will recognize that an implementation of an actual computer or computer system may have other structures and may contain other components as well, and that a high level representation of some of the components of such a computer is for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A control system for a suspended boom sprayer of a vehicle, comprising:
   a first and second sensors, each configured to be disposed on respective first and second boom wings of the suspended boom sprayer and to provide an output responsive to a rotation of the first and second boom wings caused by a disturbance torque;
   a processor, configured to determine a differential acceleration between the first and second boom wings based on the outputs of the respective sensors, and to determine the disturbance torque corresponding to the differential acceleration; and
   at least one actuator, controllable to move one or both of the first and second boom wings in order to counter the disturbance torque.

2. A control system according to claim 1, wherein:
   the first and second sensors are configured to output respective first and second tangential accelerations of the first and second boom wings; and
   the processor is configured to subtract the first tangential acceleration from the second tangential acceleration in order to determine the differential acceleration between the first and second boom wings.

3. A control system according to claim 2, wherein each of the first and second sensors comprises an accelerometer.

4. A control system according to claim 1, wherein:
   the first and second sensors are configured to output respective first and second angular velocities of the first and second boom wings; and
   the processor is configured to determine the differential acceleration between the first and second boom wings by one of either:
   subtracting the first angular velocity from the second angular velocity, and differentiating a resultant angular velocity; or
   differentiating each of the first and second angular velocities to obtain respective first and second angular accelerations, and subtracting the first angular acceleration from the second angular acceleration.

5. A control system according to claim 4, wherein each of the first and second sensors comprises a gyroscope.

6. A control system according to claim 1, wherein the processor is configured to control the at least one actuator to move one or both of the first and second boom wings in order to counter the disturbance torque.

7. A control system according to claim 1, including a controller for controlling the at least one actuator to move one or both of the first and second boom wings in order to counter the disturbance torque.

8. A control system according to claim 1, comprising a first actuator, controllable to move one of the first and second boom wings, and a second actuator, controllable to move the other of the first and second boom wings, in order to counter the disturbance torque.

9. A control system according to claim 1, wherein a boom rotation is about a roll axis (x) or a yaw axis (y) of the vehicle.

10. A control system according to claim 1, wherein the control system is integral with a suspended boom sprayer.

11. A control system according to claim 10, wherein the suspended boom sprayer is integral with a vehicle.

12. A method of controlling a suspended boom sprayer of a vehicle, comprising:
    receiving a first and second sensor outputs which are responsive to a rotation of respective first and second boom wings of the suspended boom sprayer caused by a disturbance torque;
    determining a differential acceleration between the first and second wings based on the outputs of the respective sensors;
    determining the disturbance torque corresponding to the differential acceleration; and
    moving at least one of the first and second boom wings in order to counter the disturbance torque.

13. A method of controlling a suspended boom sprayer of a vehicle according to claim 12, wherein:
    the first and second sensor outputs comprise respective first and second tangential accelerations of the first and second boom wings; and
    determining the differential acceleration between the first and second boom wings comprises subtracting the first tangential acceleration from the second tangential acceleration.

14. A method of controlling a suspended boom sprayer of a vehicle according to claim 12, wherein:
    the first and second sensor outputs comprise respective first and second angular velocities of the first and second boom wings; and
    determining the differential acceleration between the first and second boom wings comprises one of either:
    subtracting the first angular velocity from the second angular velocity; or
    differentiating between each of the first and second angular velocities to obtain respective first and second angular accelerations, and subtracting the first angular acceleration from the second angular acceleration.

15. A non-transitory computer-readable medium storing computer program instructions for controlling a suspended boom sprayer, the computer program instructions, when executed on a processor, cause the processor to perform operations comprising:
    receiving a first and second sensor outputs which are responsive to a rotation of respective first and second boom wings of the suspended boom sprayer caused by a disturbance torque;
    determining a differential acceleration between the first and second wings based on the outputs of the respective sensors;
    determining the disturbance torque corresponding to the differential acceleration; and
    moving at least one of the first and second boom wings in order to counter the disturbance torque.

16. The non-transitory computer-readable medium of claim 15 wherein the first and second sensor outputs comprise respective first and second tangential accelerations of the first and second boom wings, and the determining the differential acceleration between the first and second boom wings operation further comprises:
    subtracting the first tangential acceleration from the second tangential acceleration.

17. The non-transitory computer-readable medium of claim 15 wherein the first and second sensor outputs comprise respective first and second angular velocities of the first and second boom wings, and the determining the differential acceleration between the first and second boom wings operation further comprises:
   subtracting the first angular velocity from the second angular velocity.

18. The non-transitory computer-readable medium of claim 15 wherein the first and second sensor outputs comprise respective first and second angular velocities of the first and second boom wings, and the determining the differential acceleration between the first and second boom wings operation further comprises:
   differentiating between each of the first and second angular velocities to obtain respective first and second angular accelerations, and subtracting the first angular acceleration from the second angular acceleration.

\* \* \* \* \*